United States Patent [19]

Adamis

[11] 4,006,676
[45] Feb. 8, 1977

[54] CREPE-MAKING PAN AND SUPPORT

[75] Inventor: Robert J. Adamis, San Mateo, Calif.

[73] Assignee: Atlas Metal Spinning Company, San Francisco, Calif.

[22] Filed: Dec. 19, 1975

[21] Appl. No.: 642,403

[52] U.S. Cl. .................. 99/422; 99/431; 99/444; 126/215

[51] Int. Cl.² .......................... A47J 37/10

[58] Field of Search ............. 99/422–423, 99/372, 375, 425–432, 447, 340, 385, 450, DIG. 15, 444, 446; 126/215; 294/7, 8

[56] References Cited

UNITED STATES PATENTS

| 600,398 | 3/1898 | Bailey | 126/215 |
| 881,199 | 3/1908 | Palmer | 126/215 |
| 1,121,575 | 12/1914 | Abtmeyer | 99/385 UX |
| 1,316,365 | 9/1919 | Jackson et al. | 99/450 |
| 2,026,829 | 1/1936 | Ellinger | 99/DIG. 15 |
| 2,222,512 | 11/1940 | Moyen | 99/DIG. 15 |
| 3,349,726 | 10/1967 | Fono | 99/423 X |
| 3,509,813 | 5/1970 | Appelt | 99/432 |

FOREIGN PATENTS OR APPLICATIONS

| 1,168,284 | 8/1958 | France | 126/215 |

*Primary Examiner*—Harvey C. Hornsby
*Assistant Examiner*—Arthur O. Henderson
*Attorney, Agent, or Firm*—George B. White

[57] ABSTRACT

The crepe pan is such that it is adapted to distribute the batter over the flat exposed bottom surface of the bottom of the pan; a base locates and supports the pan in position and is so dimensioned as to surround the flame and distribute the heat evenly over the flat bottom of the pan; the weight distribution of the pan and its handle being such that the pan will be firmly seated around a suitable flange on a shoulder adjacent the flange of the substantially cylindrical base.

2 Claims, 2 Drawing Figures

CREPE-MAKING PAN AND SUPPORT

BACKGROUND OF THE INVENTION

The making of crepes or thin pancakes on the bottoms of frying pans in an inverted position is old. Patent No. 3349726 uses an inverted pan. There are also heat reflective devices for smoking and cooking used as bases, some covered by a lid.

However, the prior art did not provide for the combination of an inverted pan and its positive support on the top of a base which evenly distributes the heat on the flat bottom of the pan for the purpose of forming an evenly thin crepe.

The primary object of this invention is to provide a combination of a crepe pan and a support on which the pan is positively located in its operative position uniformly spaced from the heating flame at a fixed distance so that the base circulates the heat from below and the heat is distributed over the flat bottom of the pan.

DETAILED DESCRIPTION

Figure 1:
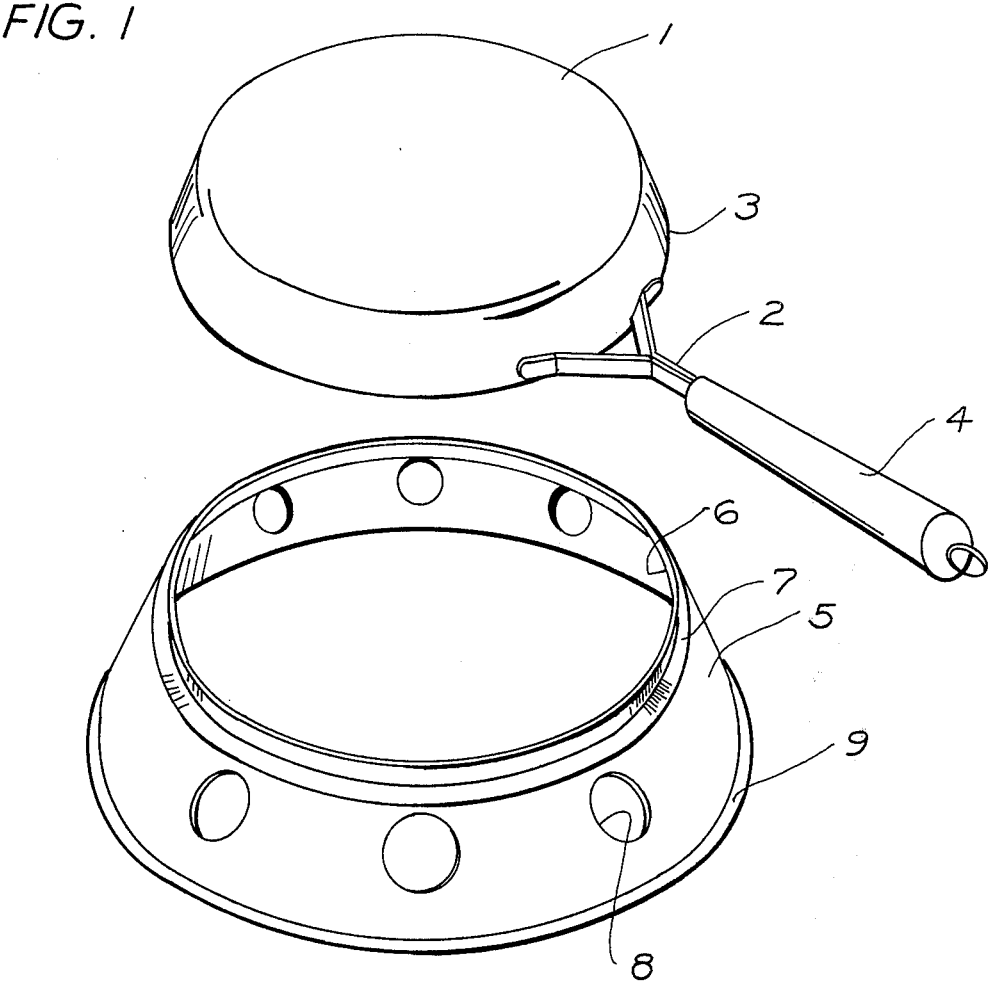
FIG. 1 is a developed view showing the pan above the spacer.
Figure 2:
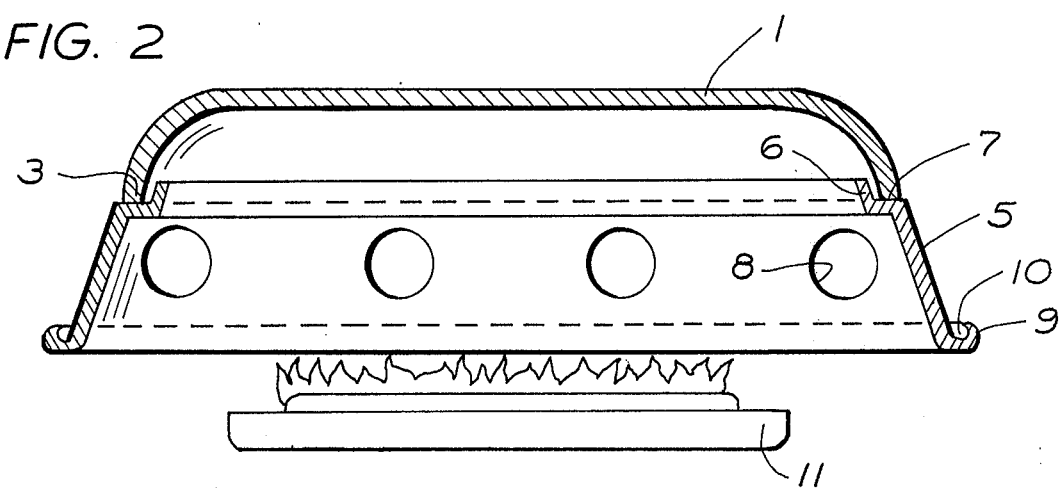
FIG. 2 is a cross-sectional view of the pan on the spacer above the flame.

A pan 1 has a flat bottom 2. A metal connection extends from the outer periphery near the rim edge 3 thereof. A light, perferably wooden, handle 4 is on the connection. The relative weight of the pan 1 and the handle 4 is such that the center of gravity of the inverted pan 1 is well within the area of the bottom of the pan.

A spacer base 5 consists of a frusto-conical band on the upper end of which is an annular flange 6 at the base of which latter is a shoulder 7. The flange 6 is of a dimension to fit into the interior of the inverted pan adjacent the rim thereof, while the edge 3 of the pan 1 rests upon the annular shoulder 7.

The base 5 is provided with holes 8 spaced from one another around the periphery of the spacer base 5 in such a manner as to provide vents evenly distributed around the entire spacer base 5. The lower edge of the spacer base 5 is bent upward into a base flange 9 so as to form annular channel 10. The wider end of the frusto-conical spacer base 5 is of a dimension to surround the flame of a usual burner of heating element 11.

In operation, the exposed face of the flat bottom of the pan 1 is dipped into the batter, then the pan 1 is inverted and placed upon the shoulder 7 to be held in position. The heat from the heating element 11 vents through the holes 8 around the entire circumference and is spread as it rises upward against the flat inside surface of the bottom 2 thereby to heat the same evenly and bake the crepe for the time required. Then the crepe is slightly loosened and as the pan 1 is turned the crepe drops.

I claim:

1. In combination a pan having a convex bottom and a concave interior,
    and a spacer band at the concave side of the pan adapted to surround a heating source,
    said band having spaced vents around its periphery for even distribution of the heat along the concave surface of the pan,
    and a manipulating handle extended from the outer periphery of said pan,
    said band having a shoulder extended inwardly from the outer periphery of the top of the band on which the rim edge of the concave side of the pan rests,
    and having an annular retaining flange spaced inwardly from the outer periphery of the band and extending from said shoulder into the concave side of the pan adjacent the rim thereof to prevent significant movement of said pan;
    and the distribution of weight of said pan and said handle being such that the center of gravity of said pan when resting on said shoulder is within the area of said band,
    the handle having a heat insulating grip thereon.

2. The invention specified in claim 1, and said band being frusto-conical narrowing toward said shoulder,
    and the bottom edge of said band being formed into an annular channel all around the circumference of the band.

* * * * *